Patented June 6, 1950

2,510,177

UNITED STATES PATENT OFFICE 2,510,177

HOT MELT COATING COMPOSITION

William Horback, Irvington, N. J., assignor to Celanese Corporation of America, a corporation of Delaware No Drawing. Application November 29, 1946, Serial No. 713,100

2 Claims. (Cl. 106—181)

This invention relates to coating compositions and relates more particularly to hot-melt coating compositions having a basis of cellulose propionate and adapted to be applied in a molten condition.

An object of this invention is the provision of hot-melt coating compositions having a basis of cellulose propionate.

Another object of this invention is to provide hot-melt coating compositions having a basis of cellulose propionate which are odorless, stable to heat, and melt at temperatures not greater than about 200° C.

Other objects of this invention will appear from the following detailed description.

The hot-melt coating compositions which are most generally employed commercially normally comprise a film-forming material, such as, for example, ethyl cellulose, together with natural or synthetic resins, waxes, softening agents, blending agents and one or more plasticizers for the ethyl cellulose material. These compositions are frequently found to be unstable when maintained in a molten condition for any substantial period of time. The compositions become dark and discolored due to decomposition and yield films or coatings of an undesirable appearance.

I have now found that stable, hot-melt coating compositions having a basis of cellulose propionate and yielding easily strippable, moisture-proof, non-tacky, non-blocking and heat-sealing films when applied to a suitable surface in a molten condition may be obtained without employing waxes, resins, blending agents and the like in formulating said compositions. In accordance with my invention, I prepare improved hot-melt coating compositions by incorporating from about 40 to about 100 parts by weight of an active solvent plasticizer or mixture of active solvent plasticizers in about 100 parts by weight of cellulose propionate having from 0.1 to 0.5 free hydoxy groups therein per glucose unit and a viscosity of 10 to 100 centipoises. The amount of plasticizer employed in my novel coating composition depends upon the qualities desired in the coating produced therefrom or in the composition per se. Thus, if it is desired that the coating have increased toughness, lesser amounts of plasticizer are employed, while where it is desired that the composition have a lower melting point or increased flowability, greater amounts of the plasticizer are employed.

Examples of suitable active solvent plasticizers which may be employed in forming my novel hot-melt coating compositions are dibutyl sebacate, dioctyl sebacate, dioctyl azelate, dibenzyl sebacate, tricresyl phosphate, para-ethyl toluene sulfonamide, etc. A somewhat increased degree of toughness in the coating may also be obtained where desirable, if up to about 25% of the active solvent plasticizer employed is replaced by an inactive plasticizer which has substantially no solvent action on the cellulose propionate. Examples of such inactive plasticizers are butyl stearate, butoxyethyl stearate, amyl oleate and partially hydrogenated terphenyls. Where up to 10% of the active solvent plasticizer is replaced by an inactive plasticizer, the coatings produced therefrom retain their transparency. The use of increased amounts of inactive plasticizer, say 10 to 25% of the active solvent plasticizer produces translucent films and are excellent where clarity or transparency is not essential. Where the hot-melt coatings are to be exposed to sunlight or to elevated temperatures, light stabilizers such as phenyl salicylate, and heat stabilizers such as calcium lactate, may also be added to the hot-melt composition in amounts of from 0.5 to 5.0% by weight of the cellulose propionate present therein. Any suitable pigment, dye or effect material such as pearl essence to produce an iridescent effect, for example, may also be incorporated in the hot-melt coating compositions.

Particularly valuable results are obtained in forming said compositions by employing cellulose propionates of a lacquer grade having about 0.3 free hydroxyl groups therein per glucose unit and a viscosity of from 10 to 25 centipoises. While these cellulose propionates are usually unsuitable for the preparation of thermoplastic molding compositions owing to their low viscosities or degree of polymerization, they are especially valuable in the production of my novel hot-melt coating compositions since they yield compositions which melt between about 130 to 200° C. depending upon the viscosity of the particular cellulose propionate and the amount of plasticizer present. The coatings obtained by applying said hot-melt cellulose propionate coating compositions to wood, paper, metal, cloth or other base material are non-tacky, non-blocking films which are not only heat-sealing and moisture-proof but are easily strippable as well, from smooth surfaces such as glass, metal and the like. Where rough surfaces such as paper or fabric are coated and penetration by the coating composition is substantial, stripping said films therefrom is quite difficult or even impossible.

The viscosity of the cellulose propionate is determined by drying a sample of the flake material for one-half hour at 100 to 105° C., dissolving three grams of the dried flake in 50 cc. of acetone containing 2% by weight of water and then measuring the viscosity of the solution at 25° C. in an Ostwald type viscometer such as is described in A. S. T. M. specification D-445-42T, the viscometer being initially standardized with oils of known viscosity supplied by the National Bureau of Standards.

In order further to illustrate my invention, but without being limited thereto, the following examples are given:

Example I 100 parts by weight of pulverized cellulose propionate having 0.3 free hydroxyl groups and a viscosity of 50 centipoises are mixed with 90 parts by weight of dibutyl sebacate and 10 parts by weight of butoxyethyl stearate and the mixture is heated to about 190° C. to cause the mixture to melt and fuse to a homogeneous, fluid mass. The molten mixture is then coated in a layer of about 0.055 inch in thickness on to an absorbent paper base. The coating composition sets immediately on cooling and forms a smooth, non-tacky and non-blocking, fairly hard coating on the paper base which is impermeable to moisture. The coating obtained adheres tenaciously to the paper base, however,, because of the rough absorptive surface, and imparts thereto additional strength and resistance to tearing.

Example II 100 parts by weight of finely divided cellulose propionate having 0.15 free hydroxyl groups therein and a viscosity of 10 centipoises is mixed thoroughly with 100 parts by weight of dioctyl sebacate and 5 parts by weight of calcium lactate and heated to 130° C. to melt the mixture obtained. The molten composition is then applied to the surface of a smooth metal rod by dip-coating to form a film or layer 0.001 inch in thickness. The coating formed on the metal surface is smooth, clear, and transparent and may be easily stripped therefrom because of the smooth non-absorptive surface.

Example III 100 parts by weight of cellulose propionate having 0.5 free hydroxyl groups and a viscosity of 75 centipoises are mixed with 100 parts by weight of dioctyl azelate and heated to about 180° C. The hot-melt obtained is then employed for impregnating Canton flannel, the latter finding very satisfactory application as "box toe" material in the manufacture of shoes.

Example IV 100 parts by weight of cellulose propionate having 0.4 free hydroxyl groups and a viscosity of 25 centipoises are mixed with 50 parts of a mixture of 75 parts by weight of tricresyl phosphate and 25 parts by weight of partially hydrogenated isomeric terphenyls and the mixture heated to about 190° C. so that it melts. The molten composition may be coated on to metal surfaces by dipping, for example, and forms an easily strippable protective film thereon which guards the metal surface from corrosion.

In addition to the coating of continuous surfaces, my novel hot-melt coating compositions may also be employed for coating filaments, fibers, threads, ropes, etc. to impart excellent water-resistant properties thereto. They may also be employed for coating open-mesh screening of glass fibers, wire or plastic materials, the application being so effected as to seal the interstices or merely to coat the woven threads or wires and to anchor the latter so that they will be more resistant to deformation. The use of said hot-melt compositions is highly advantageous since it eliminates the use of volatile solvents which may attack the base material. Furthermore, the coated materials do not require any drying or seasoning to expel volatile solvents.

It is to be understood that the foregoing detailed description is given merely by way of illustration and that many variations may be made therein without departing from the spirit of my invention.

Having described my invention, what I desire to secure by Letters Patent is:

1. A hot-melt coating composition adapted to form smooth, heat sealing, moisture-proof and non-tacky coatings, comprising 100 parts by weight of cellulose propionate having from 0.1 to 0.5 free hydroxyl groups therein per glucose unit and a viscosity of 10 to 100 centipoises in which are incorporated from 40 to 100 parts by weight of a mixture of plasticizers for the cellulose propionate, up to 25% by weight of said mixture being butoxyethyl stearate and the remainder dibutyl sebacate.

2. A hot melt coating composition adapted to form smooth, heat-sealing, moisture-proof and non-tacky coatings, comprising 100 parts by weight of a cellulose propionate, having 0.3 free hydroxyl groups per glucose unit and a viscosity of 50 centipoises, in which are incorporated 100 parts by weight of a mixture of plasticizers for the cellulose propionate, 90 parts by weight being dibutyl sebacate and 10 parts by weight being butoxyethyl stearate.

WILLIAM HORBACK.

REFERENCES CITED

The following references are of record in the file of this patent:

UNITED STATES PATENTS

| Number | Name | Date |
|---|---|---|
| 2,015,088 | Reid | Sept. 24, 1935 |
| 2,117,827 | Smith | May 17, 1938 |
| 2,209,357 | Smith | July 30, 1940 |
| 2,261,140 | Conklin | Nov. 4, 1941 |
| 2,387,773 | Salo | Oct. 30, 1945 |
| 2,397,320 | Koch | Mar. 26, 1946 |
| 2,410,685 | Salo | Nov. 5, 1946 |

FOREIGN PATENTS

| Number | Country | Date |
|---|---|---|
| 369,294 | Great Britain | Mar. 24, 1932 |
| 428,160 | Great Britain | May 8, 1935 |